United States Patent [19]
Kubota

[11] Patent Number: 5,914,469
[45] Date of Patent: Jun. 22, 1999

[54] STEERING COLUMN SWITCH

[75] Inventor: Minoru Kubota, Shizuoka-ken, Japan

[73] Assignee: Yazaki Corporation, Tokyo, Japan

[21] Appl. No.: 08/736,526

[22] Filed: Oct. 24, 1996

[30] Foreign Application Priority Data

Oct. 27, 1995 [JP] Japan ................................. 7-280798

[51] Int. Cl.⁶ .............................. H01H 3/16; H01H 25/04
[52] U.S. Cl. ................................. 200/61.27; 200/61.54
[58] Field of Search .......................... 200/61.27–61.38, 200/61.54–61.57, 537–562, 512–517, 5 A, 1 B

[56] References Cited

U.S. PATENT DOCUMENTS

| | | | |
|---|---|---|---|
| 4,900,946 | 2/1990 | Williams et al. | 200/61.27 X |
| 4,918,264 | 4/1990 | Yamamoto et al. | 200/5 R |
| 4,920,239 | 4/1990 | Buhler et al. | 200/61.54 |
| 5,115,108 | 5/1992 | Ogawa et al. | 200/1 B |
| 5,147,990 | 9/1992 | Dionisio, Jr. et al. | 200/16 R |
| 5,272,290 | 12/1993 | Suzuki et al. | 200/4 |
| 5,350,893 | 9/1994 | Yamauchi et al. | 200/547 |
| 5,426,275 | 6/1995 | Maeda et al. | 200/5 R X |

FOREIGN PATENT DOCUMENTS

| | | |
|---|---|---|
| 52-47263 | 4/1977 | Japan . |
| 6-15241 | 2/1994 | Japan . |

*Primary Examiner*—J. R. Scott
*Attorney, Agent, or Firm*—Finnegan, Henderson, Farabow, Garrett & Dunner, L.L.P.

[57] ABSTRACT

A switch unit includes a rubber contact attached to a wiring substrate, a guide plate having a pushing pin capable of being brought into contact with a contact dome of the rubber contact, and a cam plate for driving the pushing pin. The switch unit is provided in a lower case, and a slider, which has a sliding contact section in contact with the cam surface of the cam plate, is located on the cam plate so as to slide freely. The rotation of the operation lever supported on the lower case is converted into linear motion of the slider by a pin and slot, and the switch unit, slider, operation lever and an upper case are laminated so as to be mounteable in the lower case. As a result, automatic installation becomes possible, and operation can be performed by moving the operation lever only slightly.

7 Claims, 7 Drawing Sheets

STEERING COLUMN SWITCH

BACKGROUND OF THE INVENTION

The present invention relates to a steering column switch, more specifically, a steering column switch which is turned on and off by operating a lever provided to a steering column of a car.

Conventionally, a steering column switch can operate a turn signal, a washer, a wiper, a light, etc. of a car by a lever of a steering column. For example, Japanese Utility-Model Laid-Open No. 52-47263 discloses a steering column switch in which an operation lever mechanism and a switch unit are installed to both surfaces of a main body installed to a steering column.

Recently, a small current-type contact has become the mainstream in order to respond to an electric system of a car. A device as shown in FIG. 1 is disclosed as a steering column switch which responds to such an electric system in Japanese Utility-Model Laid-Open No. 6-15241 (U.S. Pat. No. 5,350,893 to Yamauchi et al.

In FIG. 1, a lever 51 is installed to a main body 50 through a shaft 54 so as to be freely turned. A pair of moving contacts 52 which are opened and closed by the lever 51 and a plate 53 which presses the top section of the moving contacts 52 are provided in the main body 50. When the lever 51 is turned, the stroke of the contact operating section of the lever 51 is transmitted to the moving contacts 52 through the plate 53.

Japanese Utility-Model Laid-Open No. 52-47263 in a steering column switch, an operation lever mechanism and a switch unit are installed to both surfaces of a main body. When each part is fixed to the main body during manufacturing, it is necessary to perform the operation separately on the front side and on the back side, resulting in the problem of unsatisfactory operability of the installation.

In addition, in the steering column switch disclosed in Japanese Utility-Model Laid-Open No. 6-15241/1994 (U.S. Pat. No. 5,350,893), the above problem is addressed, but additional problems arise.

(a) Since a switch is pressed directly by the rotation of the lever 51, the switch can be provided only within proximity of the rotating section of the lever, such that it is difficult to provide various switches as a multi-function switch.

(b) When the motion of the lever 51 is complicated by (multi-axial) movement in various directions, a device for transmitting the motion of the lever 51 to the switch unit, and a stopper mechanism, etc., are required, thus enlargement of the rotating section cannot be avoided.

(c) When a distance between the axis 54 of the lever and the moving contact 52 is not increased, a stroke required for the operation of the moving contact 52 is not obtained, so it is difficult to obtain reliability of the switch.

SUMMARY OF THE INVENTION

The present invention addresses the problems discussed above, and it is an object of the present invention to provide a steering column switch which improves an installing operation by making automatic installation possible, and improves reliability of a switch when moving a lever only slightly.

In order to achieve the above object, a steering column switch of the present invention is characterized as having a lower case; a switch unit including a rubber contact attached to a wiring substrate, a guide plate having a pushing pin capable of being brought into contact with a contact dome of the rubber contact, and a cam plate connected to the guide plate so as to freely move and drive the pushing pin by motion of the cam plate, the switch unit being positioned in the lower case; a slider having a sliding contact section on a cam surface of the cam plate, the slider in the lower case so as to more freely with respect to the cam plate; an operation lever supported on the lower case; a transmitting device connecting the slider and the operation lever for converting rotation of the operation lever into linear motion and transmitting the linear motion to the slider; and an upper case connected to the lower case so as to cover the switch unit, the slider and the supporting section of the operation lever.

In accordance with the above arrangement, when the operation lever is turned (rotated), the slider moves and the sliding section pushes the cam plate so that the contact of the switch unit is turned on and off by the rotation of the cam plate. Since the cam plate moves by contact from the slider driven by the operation lever, the cam plate moves securely and the switch can be operated even by a slight motion of the operation lever. As a result, reliability of the operation of the switch is improved. For this reason, since the switch can be set in a position outside a limited space within proximity of the steering column, the number of switches used can be increased, that is, degree of freedom of design is increased.

In addition, since the switch unit, the slider, the operation lever and the upper case are laminated so as to be installed to the lower case from one side of the lower case, lamination mounting becomes possible, and automatic installation can be executed.

In addition, the cam surface of the cam plate can be composed of a two-stage tapered surface so that the center portion of the cam surface is a low point and the surfaces slant upward towards both ends of the cam surface.

In accordance with the above arrangement, when the lever is reciprocated, the lever is in neutral, and the two contacts are in the on/off position.

In addition, the cam surface of the cam plate can be composed of multi-stage tapered surface.

In accordance with the above arrangement, the cam plate can be arbitrarily moved by the arrangement of the multi-stage tapered surface, thereby making complicated switch operation possible.

Furthermore, the transmitting device can be arranged so as to have a pin provided to the rotating mechanism of the lever, and a slot to which the pin formed on the slider is engaged.

In accordance with the above arrangement, the rotation of the lever can be securely converted into a linear motion of the slider through the slot.

For a fuller understanding of the nature and advantages of the invention, reference should be made to the ensuing detailed description taken in conjunction with the accompanying drawings.

DESCRIPTION OF THE PREFERRED EMBODIMENTS

The following describes embodiments of the present invention in reference to the drawings. FIGS. 2 through 6 show a first embodiment of the present invention.

Figure 1:
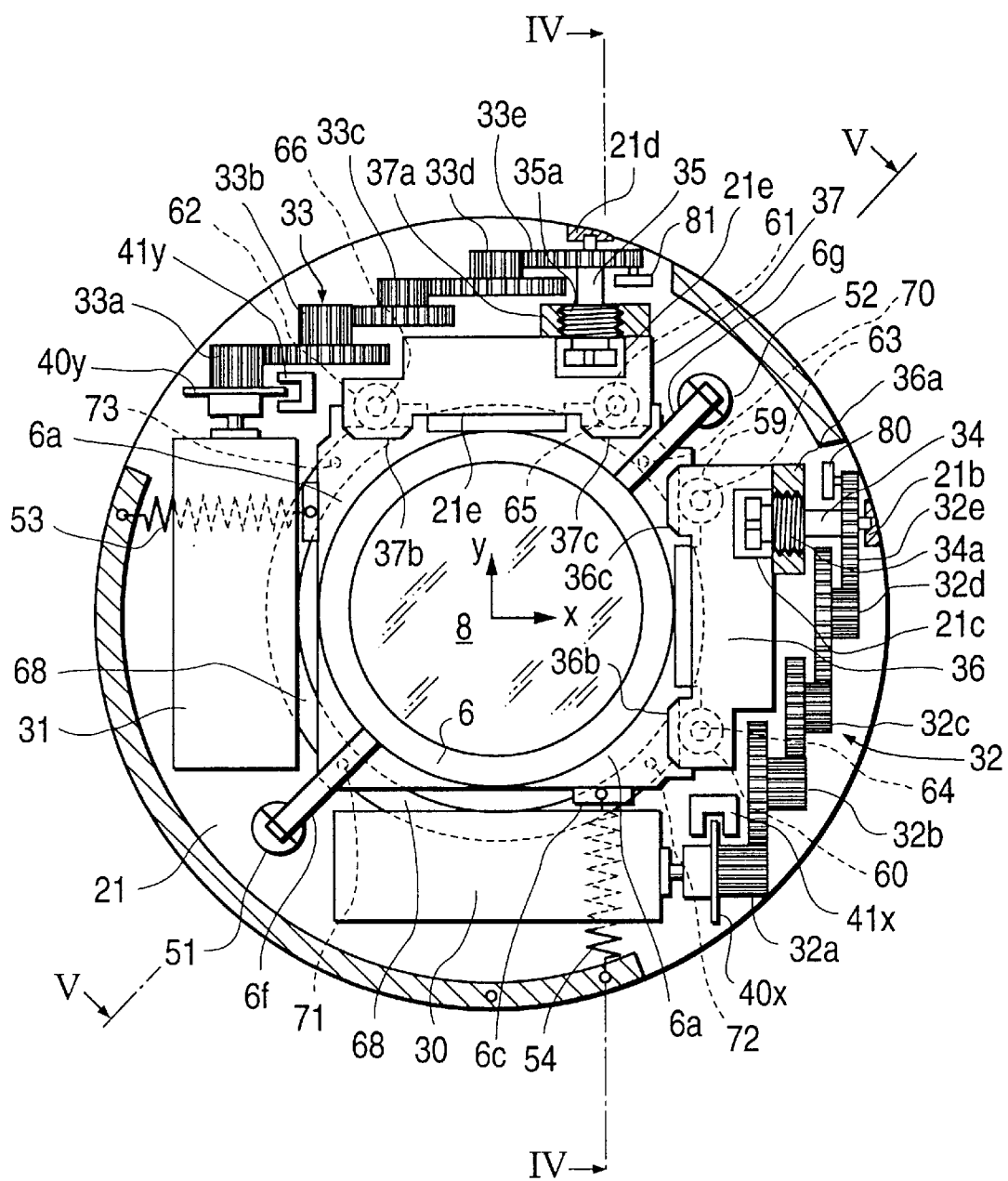
FIG. 1 is a plan view showing a conventional steering column switch.
Figure 2:
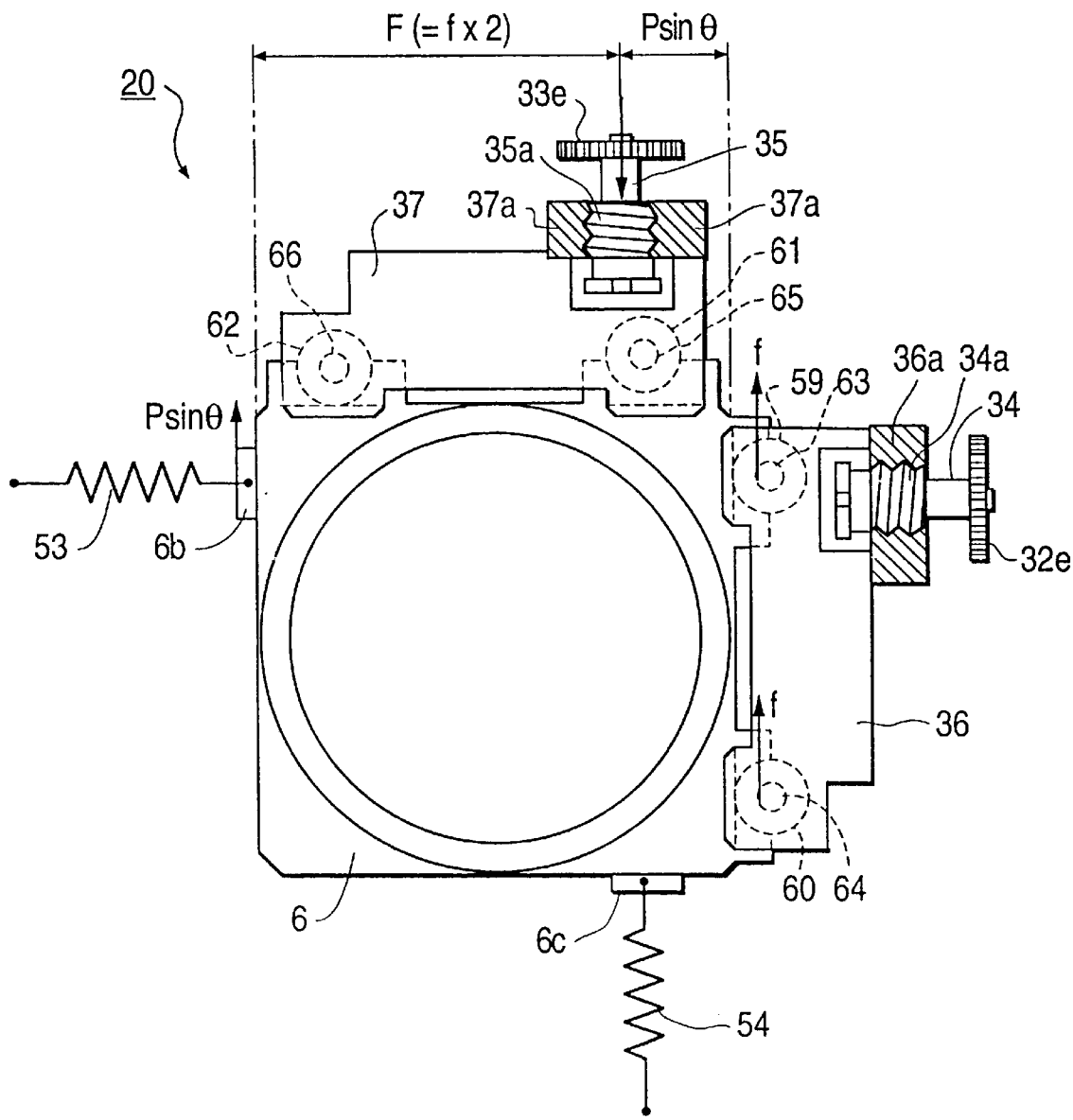
FIG. 2 is an exploded assembly perspective view showing a steering column switch according to one embodiment of the present invention.
Figure 3A:
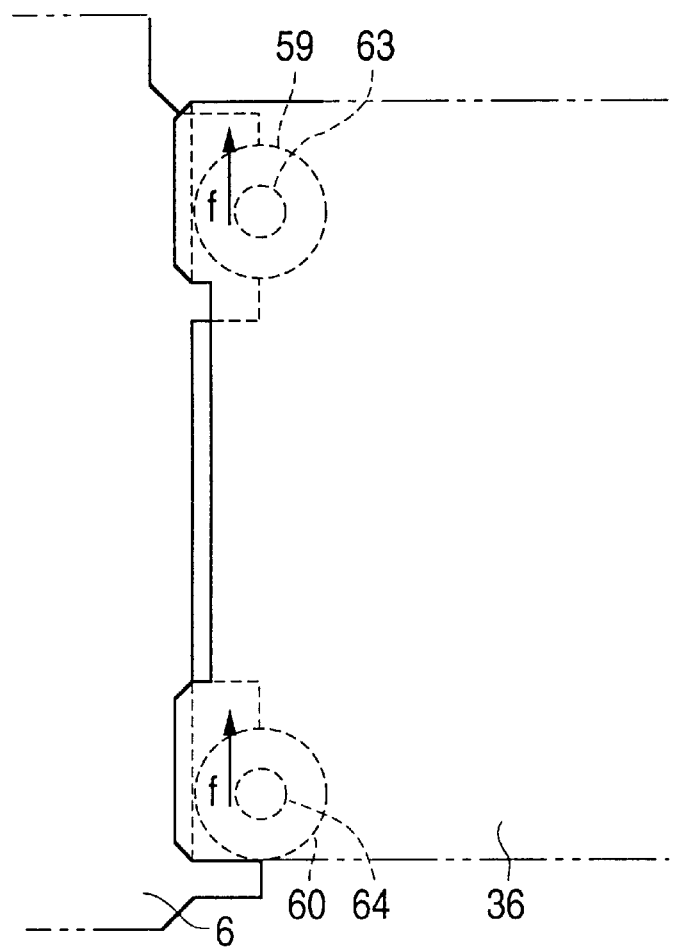
FIG. 3 is a cross-sectional view of the steering column switch shown in FIG. 1 & 2, in its switch-off state.
Figure 3B:
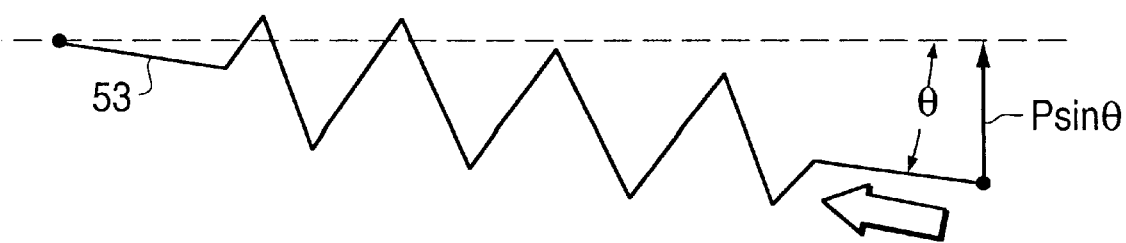

In FIG. 2, a concave section 2 is formed within a lower case 1, and a switch unit 3 is provided in the concave section 2.

Figure 5:
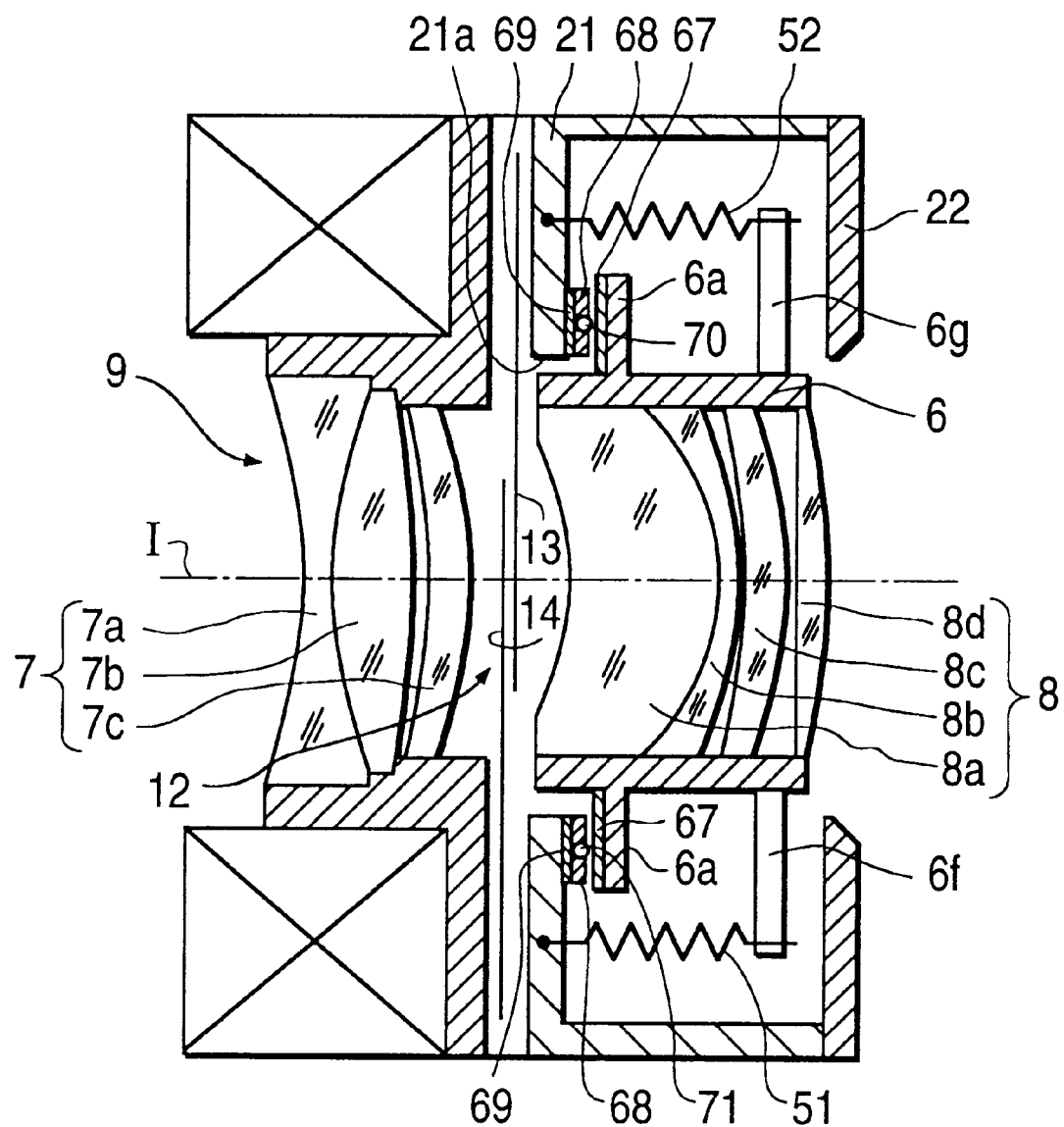
FIG. 5 is a cross sectional view taken along a line V—V in FIG. 3.
Figure 6:
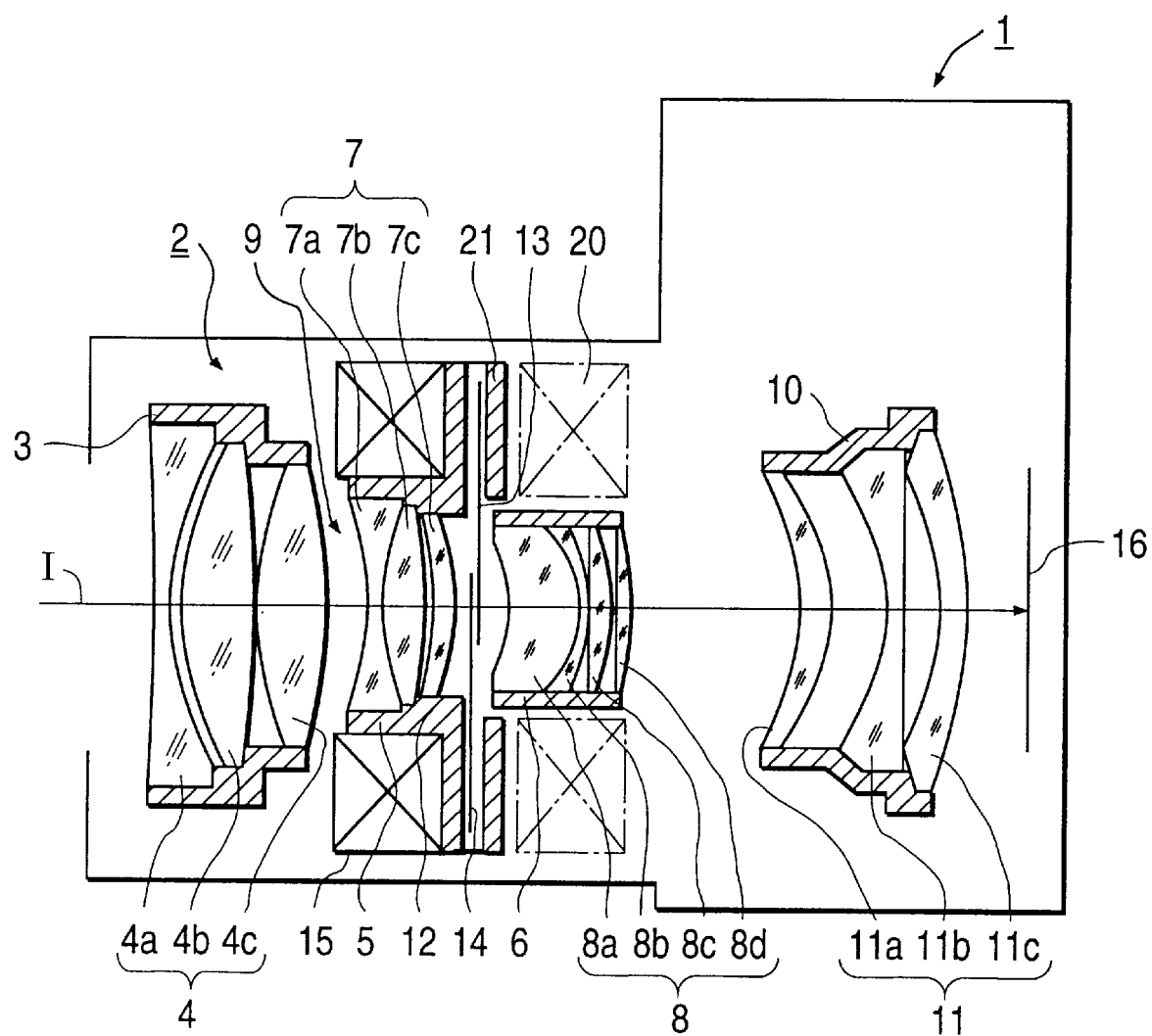
FIG. 6 is a cross sectional view taken along a line VI—VI in FIG. 3.

The switch unit 3 includes a wiring substrate 4, a rubber contact 5, a guide plate 6 and a cam plate 7 (see FIGS. 5 and 6). The rubber contact 5 includes contact domes 5a and is attached to the wiring substrate 4. The wiring substrate 4 is fixed to a convex section 9 of a back surface of the guide plate 6.

The guide plate 6 is fitted into a concave groove 11 formed on a bottom part of the lower case 1, and is fixed to the lower case 1 by a screw 19 through a spacer 12. Pushing pins 10 are capable of being brought into contact with the contact dome 5a are fitted into the guide plate 6 so as to be freely slidable within the guide plate, and a cam plate 7 is held on an opposite surface of the guide plate than the wiring substrate 4 by a shaft 22 so as to be freely rotated. Protrusion 13 are capable of being brought into contact with the pushing pins 10 and are formed on a surface of the cam plate 7 facing the guide plate. A cam surface 8, composed of tapered surfaces 8b and 8c whose center portion 8a is lowest point and whose surfaces are sloped up towards both ends of the cam plate is provided to a surface of the cam plate 7 not facing the guide plate 6.

A slider 14 is positioned on the switch unit 3 provided in the concave section 2 of the lower case 1. A guide pin 15 and a sliding contact section 16 are formed on opposite ends of the slider 14, and a slot 17 is formed on an upper surface of the slider 14, and a guide groove 18 is formed on a lower surface of the slider 14 (see FIG. 6). The guide groove 18 is fitted to the upper end surface of the guide plate 6 so as to be freely slideable. The guide pin 15 is fitted into a guide hole 21 (see FIG. 3) of the lower case 1 so as to be freely slideable within guide hole 21, and a rib 16a formed on an inner surface of the sliding contact section 16 is brought into contact with the cam surface 8 of the cam plate 7. A guide groove 20 is also formed on the upper surface of the slider 14, and the guide groove 20 is fitted into a guide section (not shown) of an upper case 31, mentioned later, so as to be freely slid (see FIG. 5).

An operation lever 23 is provided, the operation lever 23 including an operating section 23a, and a rotating mechanism section 23b provided to a tip of the operating section 23a. The rotating mechanism section 23b is mounted to a shaft section 26 of the lower case 1 so as to be freely rotated. A pin 30 is mounted to a lower surface of the rotating mechanism section 23b, and the pin 30 engages the slot 17 of the slider 14 so as to compose the transmitting device for converting the rotation of the operation lever 23 into rectilinear motion of the slider 14 (see FIGS. 3 and 4).

A pair of foot sections 29 are provided on a tip of the rotating mechanism section 23b, and a guide roller 27 is mounted to the tip of each foot sections 29. The guide roller 27 rolls along an inner surface of a side wall section 28 of the lower case 1.

The switch unit 3, the slider 14, and the upper case 31, which covers the rotating mechanism section 23b of the operation lever 23, are disposed on the operation lever 23. A shaft section 33 on the upper surface of the operation lever 23 is inserted into a shaft hole 32 of the upper case 31. A canceler 34 for canceling a turn signal is provided on the inner surface of the upper case 31. The upper case 31 is fixed to the lower case 1 by a machine screw or the like.

Figure 8:
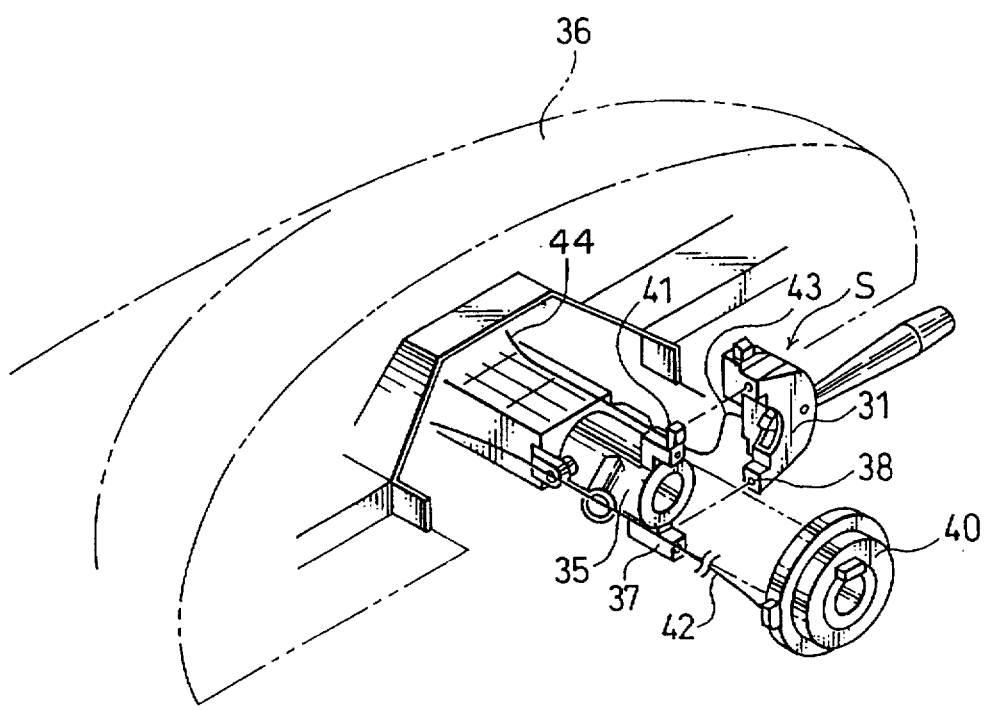
FIG. 8 is a perspective view showing installation of the steering column switch of the present invention to a steering column.

As shown in FIG. 8, a steering column switch S having the aforementioned arrangement is installed to a side section of a steering column 35 of a car. In FIG. 8, the upper case 31 is fixed to a fixing section 37 of the steering column 35 provided below an instrument panel 36 by screws through a tapped hole 38. An electric wire 42 of a clock spring 40 mounted to the steering column 35 and an electric wire 44 of a connector 41 mounted to the fixing section 37 are connected to electronic equipment such as a turn signal, a washer, a wiper and a light, and the wiring substrate 4 (see FIG. 2) of the steering column switch S is connected to the connector 41 by a lead wire 43.

The following describes an function of the steering column switch S according to the present embodiment.

Figure 3:
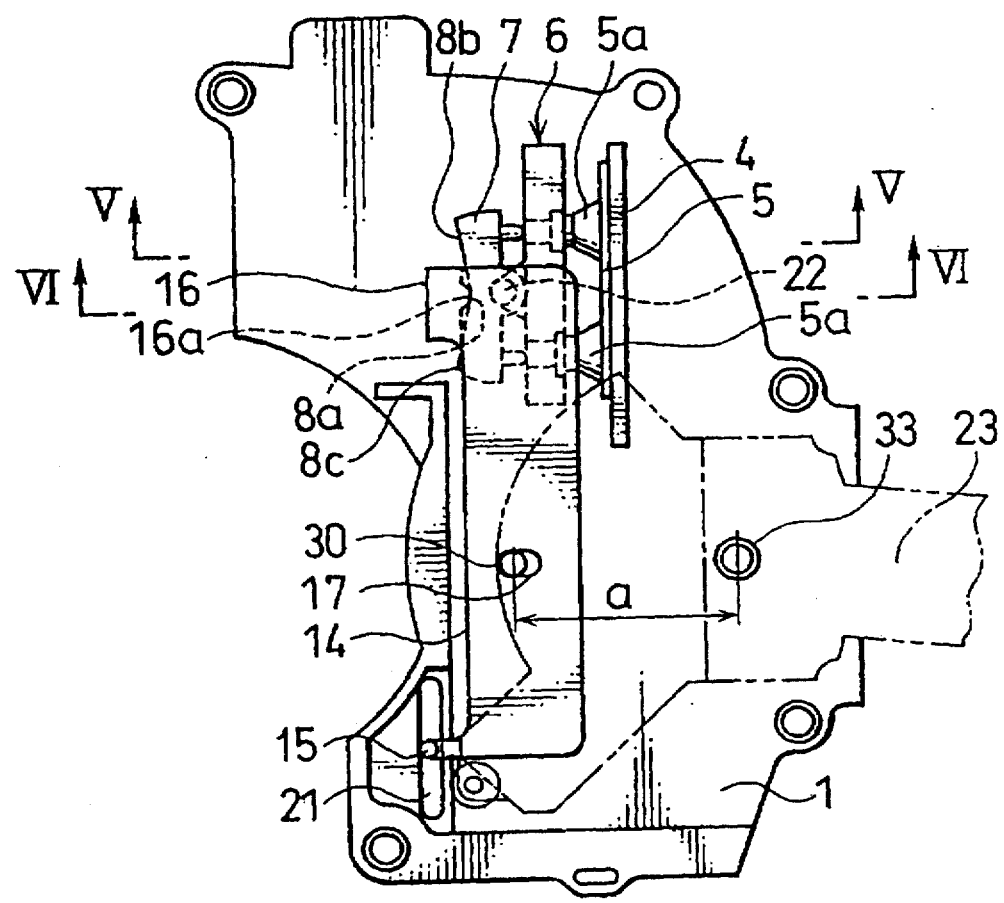
Figure 4:
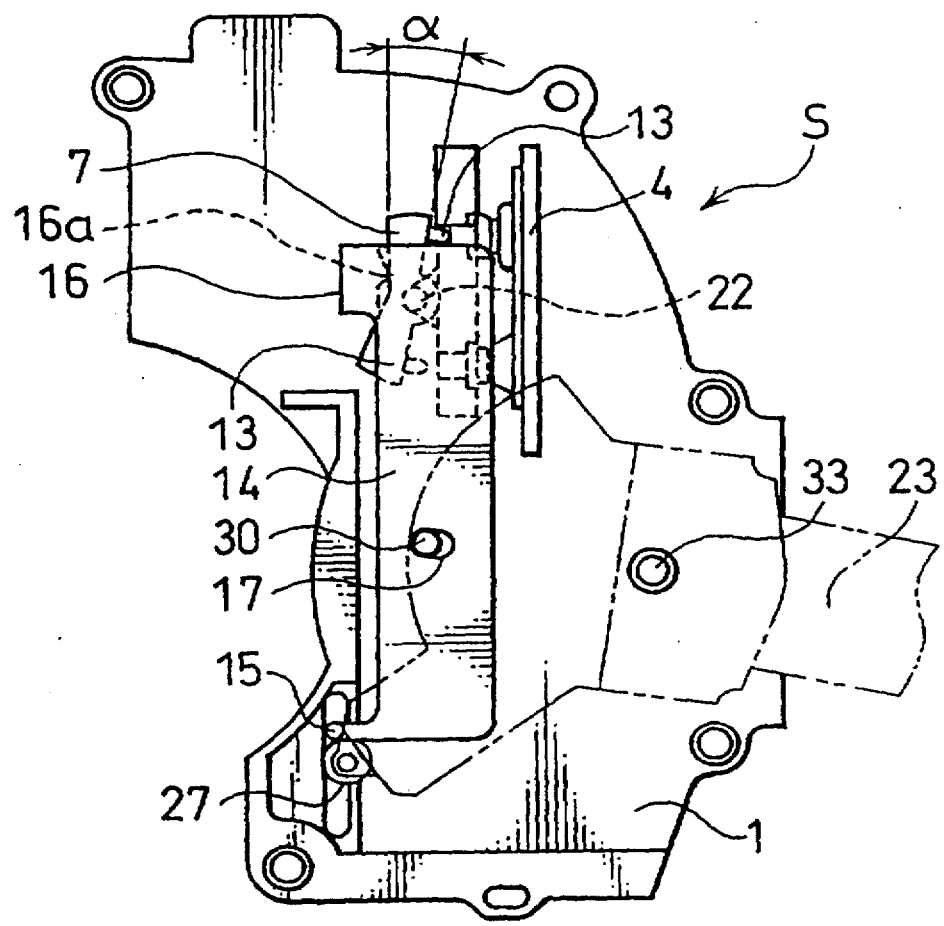
Figure 5:
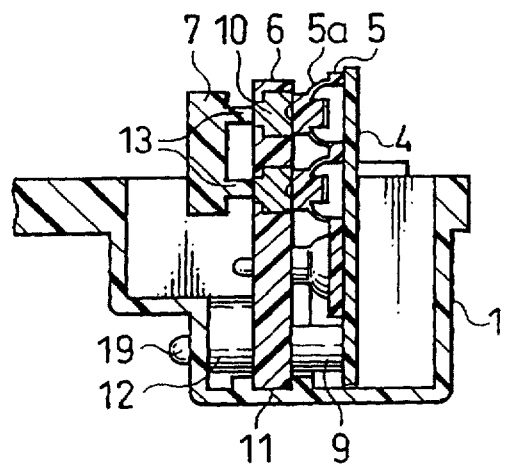
Figure 6:
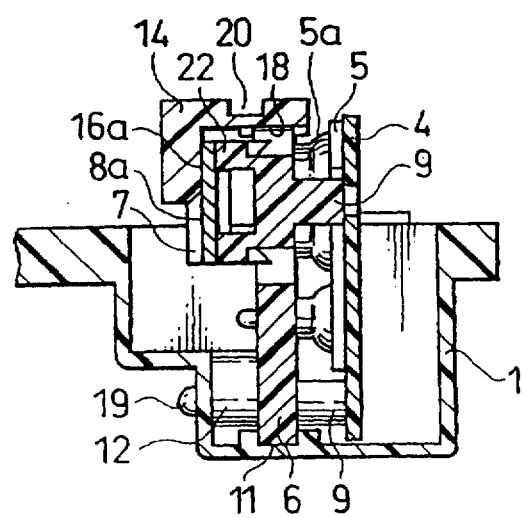

In FIG. 3, the steering column switch S is in a neutral (off) position, and the rib 16a of the sliding contact section 16 on the slider 14 is brought into contact with the center portion 8a on the cam surface 8 of the cam plate 7.

Figure 4:
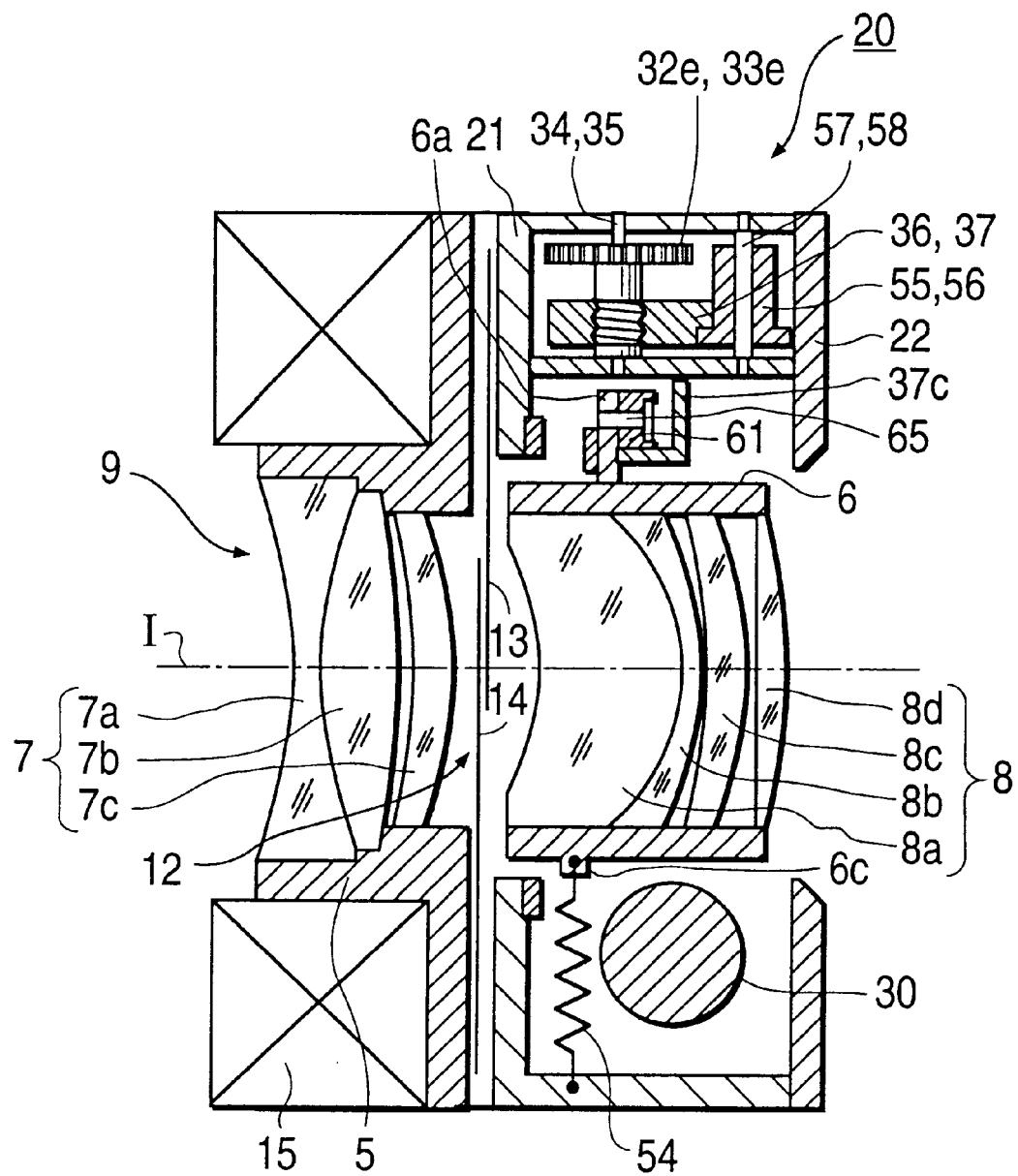
FIG. 4 is a cross-sectional view of the steering column switch shown in FIG. 2, in its switch-on state.

In this state, when the operation lever 23 is turned clockwise, as shown in FIG. 4, the slider 14 slides upward through the pin 30. Then, the rib 16a pushes the cam surfaces 8, and the cam plate 6 is turned clockwise on the shaft 22. When the protrusion 13 pushes the pushing pin 10, the dome contact 5a is switched on.

When the operation lever 23 is turned counterclockwise, the slider 14 slides downwards, and when the rib 16a pushes the cam surface 8, the cam plate 6 is turned counterclockwise on the shaft 12. Then, when the protrusion 13 pushes the pushing pin 10, the dome contact 5a is switched on.

Here, if inclination angle of the cam surface 8 is α°, when the rib 16a on the slider 14 is displaced slightly from the neutral position, the cam plate 7 is turned α° immediately. It is preferable that the inclination angle α is set so that sliding resistance between the rib 16a on the slider 14 and the cam surface 8a is reduced and the operability of the switch does not deteriorate.

A stroke of the pushing pin 10 which is pushed by the cam plate 7 can be set arbitrarily according to a relationship between the inclination angle α of the cam surface 8 and a distance a between the shaft section 33 as a supporting point of the operation lever 23 and the pin 30 as a point of action of the operation lever 23.

Figure 7:
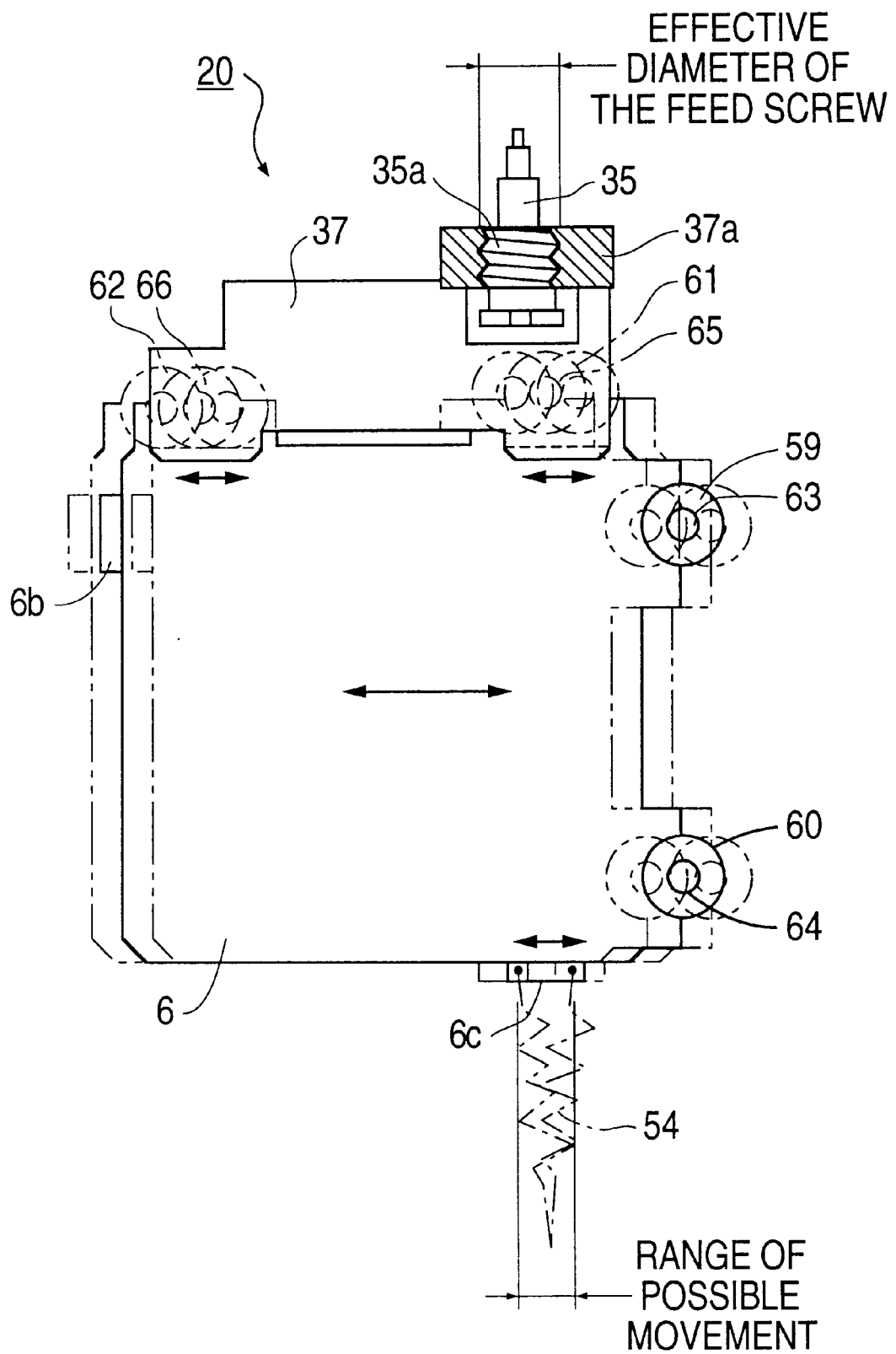
FIG. 7A is a cross sectional view of a main section of a switch unit according to another embodiment of the present invention, and shows a state of operation of a cam plate.
FIG. 7B is a cross sectional view of a main section of a switch unit according to the embodiment of FIG. 7A, and shows a state of operation of a cam plate.
FIG. 7C is a cross sectional view of a main section of a switch unit according to the embodiment of FIG. 7A, and shows a state of operation of a cam plate.
Figure 1:
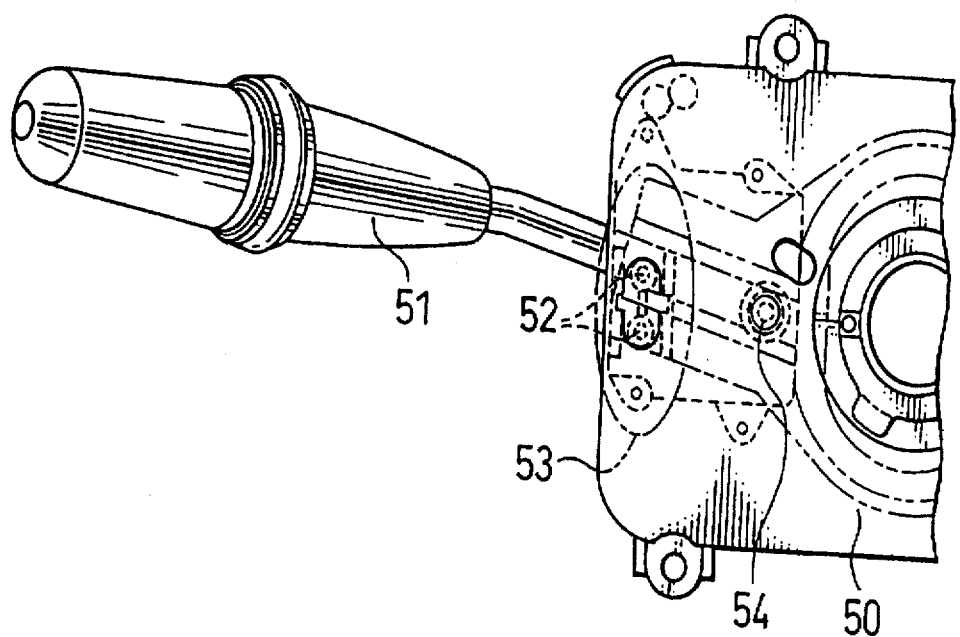
Figure 2:
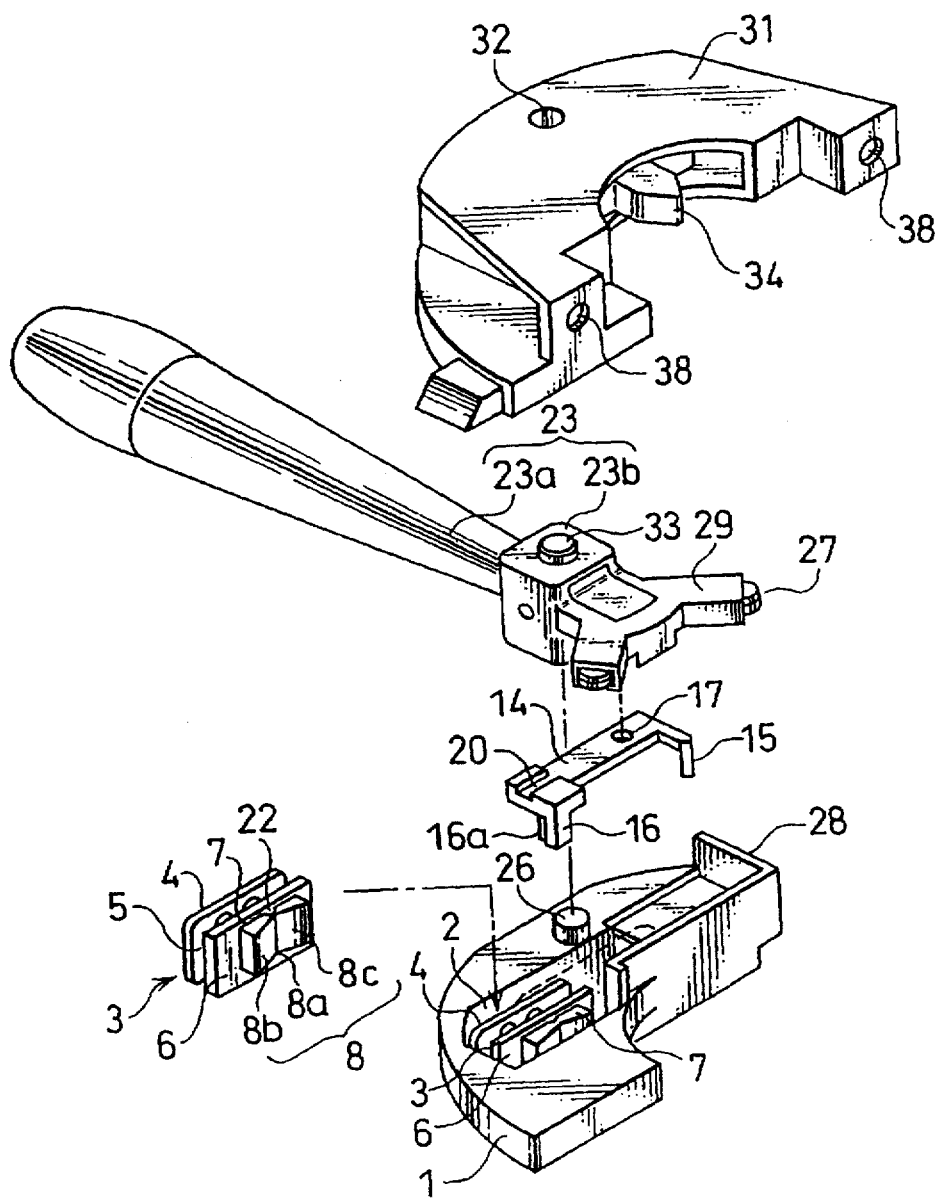

FIG. 7 shows second embodiment of the present invention, more specifically, a modification of the cam plate 7. The cam surface 8 of the cam plate 7 according to the second embodiment is composed of multi-stage tapered surfaces. Namely, the cam surface 8 is composed of the two tapered surfaces 8b and 8c, and a downwardly sloping tapered surface 8d.

Figure 7C:
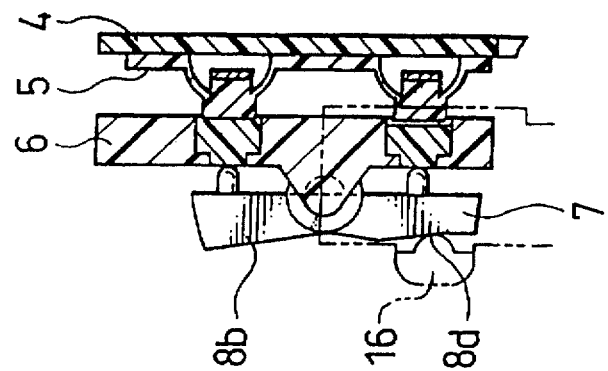
Figure 7B:
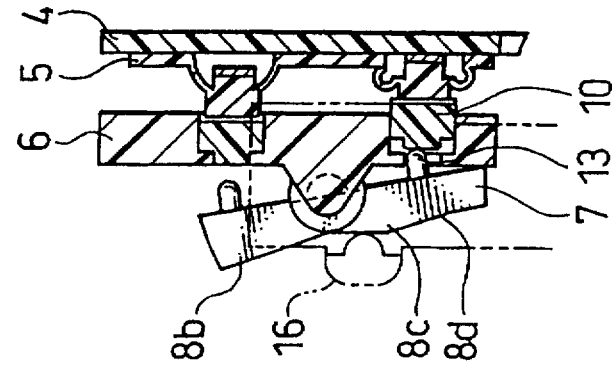
Figure 7A:
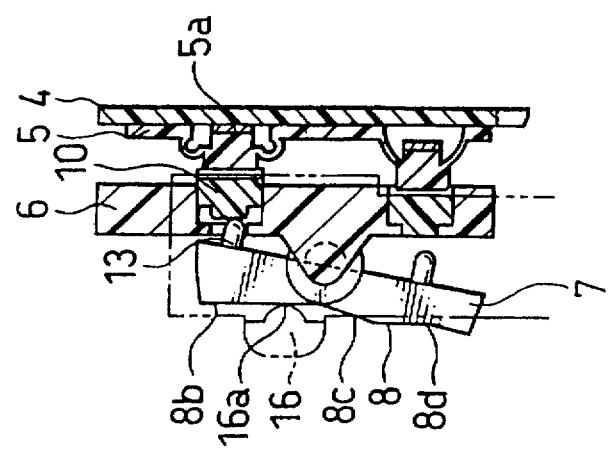

As shown in FIG. 7A, when the rib 16a of the sliding contact section 16 on the slider 14 is brought into contact with the upper tapered surface 8b, the protrusion 13 pushes the upper pushing pin 10, and the upper contact dome 5a is switched on. As shown in FIG. 7B, when the slider 14 is displaced downward, the rib 16 is brought into contact with the tapered surface 8c, and the contact dome 5a is switched on. Moreover, when the slider 14 is further displaced downward, as shown in FIG. 7C, the rib 16a is brought into contact with the tapered surface 8d so that the switch is in the neutral position. In this case, the slider 14 is displaced at a constant pitch.

The steering column switch according to the present embodiment can be utilized for the operation of the wiper, for example. In this case, the speed of the switch can be controlled so as to be high (FIG. 7A), low (FIG. 7B) and off (FIG. 7C).

The above arrangement of the cam surface 8 is just an example, so the tapered surface can be arranged to have 4 or more stages, for example, so that a complicated switching operation can be performed.

As mentioned, in the embodiments of the present invention, the switch unit 3 which has been previously assembled is installed to the lower case 1, and the slider 14, the operation lever 23 and the upper case 31 are laminated so as the be installed thereto. Namely, since lamination mounting is possible, automatic installation becomes possible, thereby improving productivity. Moreover, since the rotation of the operation lever 23 is converted into linear motion of the slider 14, and the cam plate 7 is actuated by the slider 14, even if a rotating amount of the operation lever 23 is small, the cam plate 7 is securely actuated, and the switch is securely operated. Moreover, since the assembly and installation are easy, maintenance is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

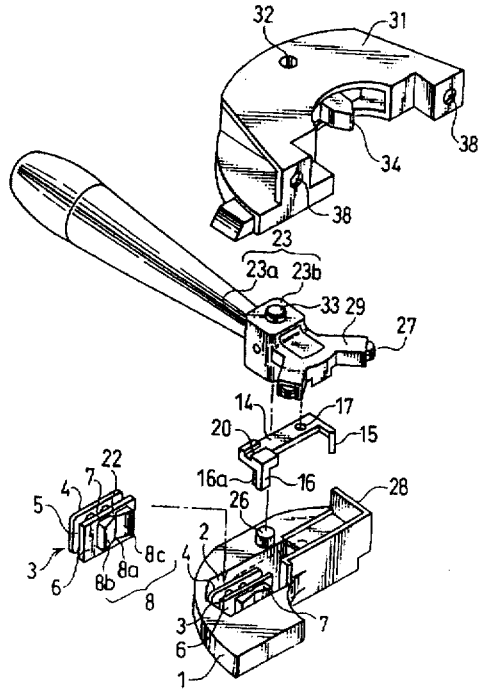

What is claimed is:

1. A steering column switch comprising:

a lower case;

a switch unit including a rubber contact attached to a wiring substrate, a guide plate having a pushing pin capable of being brought into contact with a contact dome of said rubber contact, and a cam plate connected to said guide plate so as to be freely moveable and thereby drive said pushing pin by motion of the cam plate, said switch unit being positioned in said lower case;

a slider having a sliding contact section in contact with a cam surface of said cam plate, said slider being located in said lower case so as to slide freely with respect to said cam plate;

an operation lever including an operating section and a rotating mechanism section supported on said lower case;

a transmitting device connecting said slider and said operation lever for converting rotation of said operation lever into linear motion and transmitting the linear motion to said slider, said transmitting device comprising a pin mounted to the rotating mechanism section of the operation lever and engaging a slot in the slider; and an upper case connected to said lower case to cover said switch unit, said slider and the supported section of said operation lever.

2. The steering column switch of claim 1, wherein the cam surface of said cam plate is a two-stage tapered surface such that a center portion of the cam surface is a low point of the surface and the surface slants upward towards both ends of the cam plate.

3. The steering column switch of claim 1, wherein the cam surface of said cam plate is a multi-stage tapered surface.

4. The steering column switch of claim 1, 2, or 3, wherein said transmitting device comprises a pin provided to a rotating mechanism of said operation lever and a slot formed on said slider, said pin being engaged within said slot.

5. The steering column switch of claim 1, wherein said rubber contact includes at least two contact domes and said guide plate includes at least two pushing pins.

6. The steering column switch of claim 2, wherein for each stage of the cam surface there is a corresponding rubber dome and pushing pin.

7. The steering column switch of claim 1, wherein the switch unit, slider, supported section of the operation lever, and the upper case are laminated into a unit for automatic installation.

* * * * *

UNITED STATES PATENT AND TRADEMARK OFFICE
CERTIFICATE OF CORRECTION

| | |
|---|---|
| PATENT NO. | : 5,914,469 |
| DATED | : June 22, 1999 |
| INVENTOR(S) | : Kubota |

It is certified that error appears in the above-identified patent and that said Letters Patent is hereby corrected as shown below:

<u>Title page,</u>
The title page should be deleted to appear as per attached title page.
Item [57], ABSTRACT,
Line 11, "mounteable" should read -- mountable --.

<u>Drawings,</u>
Replace Drawing Sheets 1 through 7 with the attached Drawing Sheets which contains Figures 1-8.

Signed and Sealed this

Thirtieth Day of April, 2002

Attest:

Attesting Officer

JAMES E. ROGAN
Director of the United States Patent and Trademark Office

United States Patent [19]

Kubota

[11] Patent Number: 5,914,469
[45] Date of Patent: Jun. 22, 1999

[54] STEERING COLUMN SWITCH

[75] Inventor: Minoru Kubota, Shizuoka-ken, Japan

[73] Assignee: Yazaki Corporation, Tokyo, Japan

[21] Appl. No.: 08/736,526

[22] Filed: Oct. 24, 1996

[30] Foreign Application Priority Data

Oct. 27, 1995 [JP] Japan .................................. 7-280798

[51] Int. Cl.$^6$ .............................. H01H 3/16; H01H 25/04
[52] U.S. Cl. .................................. 200/61.27; 200/61.54
[58] Field of Search ........................... 200/61.27–61.38,
200/61.54–61.57, 537–562, 512–517, 5 A, 1 B

[56] References Cited

U.S. PATENT DOCUMENTS

| | | | |
|---|---|---|---|
| 4,900,946 | 2/1990 | Williams et al. | 200/61.27 X |
| 4,918,264 | 4/1990 | Yamamoto et al. | 200/5 R |
| 4,920,239 | 4/1990 | Buhler et al. | 200/61.54 |
| 5,115,108 | 5/1992 | Ogawa et al. | 200/1 B |
| 5,147,990 | 9/1992 | Dionisio, Jr. et al. | 200/16 R |
| 5,272,290 | 12/1993 | Suzuki et al. | 200/4 |
| 5,350,893 | 9/1994 | Yamauchi et al. | 200/547 |
| 5,426,275 | 6/1995 | Maeda et al. | 200/5 R X |

FOREIGN PATENT DOCUMENTS

| | | |
|---|---|---|
| 52-47263 | 4/1977 | Japan . |
| 6-15241 | 2/1994 | Japan . |

*Primary Examiner*—J. R. Scott
*Attorney, Agent, or Firm*—Finnegan, Henderson, Farabow, Garrett & Dunner, L.L.P.

[57] ABSTRACT

A switch unit includes a rubber contact attached to a wiring substrate, a guide plate having a pushing pin capable of being brought into contact with a contact dome of the rubber contact, and a cam plate for driving the pushing pin. The switch unit is provided in a lower case, and a slider, which has a sliding contact section in contact with the cam surface of the cam plate, is located on the cam plate so as to slide freely. The rotation of the operation lever supported on the lower case is converted into linear motion of the slider by a pin and slot, and the switch unit, slider, operation lever and an upper case are laminated so as to be mounteable in the lower case. As a result, automatic installation becomes possible, and operation can be performed by moving the operation lever only slightly.

7 Claims, 7 Drawing Sheets